Aug. 22, 1967   J. C. DE SHAZOR, JR   3,336,723
MACHINE FOR ASSEMBLING CONTAINERS WITH CLIPS
Filed July 3, 1963   6 Sheets-Sheet 1

INVENTOR.
JAMES C. DE SHAZOR, JR.
BY Harold R. Beck
ATTORNEY

Aug. 22, 1967  J. C. DE SHAZOR, JR  3,336,723
MACHINE FOR ASSEMBLING CONTAINERS WITH CLIPS
Filed July 3, 1963  6 Sheets-Sheet 3

INVENTOR.
JAMES C. DE SHAZOR, JR.
BY Harold F. Beck
ATTORNEY

Aug. 22, 1967   J. C. DE SHAZOR, JR   3,336,723
MACHINE FOR ASSEMBLING CONTAINERS WITH CLIPS
Filed July 3, 1963

INVENTOR.
JAMES C. DE SHAZOR, JR.
BY *Harold R. Beck*
ATTORNEY

Aug. 22, 1967   J. C. DE SHAZOR, JR   3,336,723
MACHINE FOR ASSEMBLING CONTAINERS WITH CLIPS
Filed July 3, 1963                                6 Sheets-Sheet 6

INVENTOR.
JAMES C. DE SHAZOR, JR
BY Harold R. Beck
ATTORNEY

United States Patent Office 3,336,723
Patented Aug. 22, 1967

3,336,723
MACHINE FOR ASSEMBLING CONTAINERS WITH CLIPS
James C. De Shazor, Jr., 3314 Coy Drive,
Sherman Oaks, Calif. 91403
Filed July 3, 1963, Ser. No. 295,590
5 Claims. (Cl. 53—48)

The present invention relates to a machine and method for assembling containers with clips to form multiple container packages. Typical of the clips which may be assembled with containers by the use of the machine and method of the present invention, are those shown in U.S. patent applications Ser. Nos. 100,618, now abandoned and 174,655. The subject matter of these applications are incorporated herein by reference.

The present invention is an improvement over the disclosure contained in my prior U.S. patent application Ser. No. 270,341 filed Apr. 3, 1963 now Patent No. 3,255,566, issued June 14, 1966. The disclosure of this prior application is incorporated herein by reference.

The method and apparatus of the present invention is typically applicable to form multiple container packages in which the containers are tubular metal sleeves having top and bottom ends affixed to the sleeves by beads or rims, and commonly referred to as tin cans, and are extensively used to package food and beverages.

The present invention provides a new and improved machine and method for assembling containers and plastic clips to form an assembled multiple container package. Preferably these clips are formed from thermoplastic materials such as polyethylene, polypropylene, and polystyrene. I have found that the preferred material of fabrication is a high impact polystyrene which provides a rigid clip having sufficient yieldability and flexibility to permit snapping the can rim engaging portions onto the rims with a minimum of stressing of the plastic. In the assembling of clips to the container rims, it is essential that the rim engaging portions of the clip are not overly stressed since the holding power of the clips in the assembled package may be diminished to the point that the package is unstable and insecure during shipping and consumer use.

The machine and method according to the present invention fulfills the major requirements of the packaging industry, including:
(1) Very high speed operation;
(2) High efficiency in assembling the packages;
(3) Low maintenance of the assembling equipment;
(4) Equipment very easy to repair and unjam in the event of a jam-up of containers or packages moving through the machine; and,
(5) A packaging machine which is easily adapted for use with a high output container filling and closing machine such as are presently in use to package cans of beer.

In the drawings I have shown a present preferred embodiment of my invention.

Briefly, the present invention is directed to a method and apparatus for assembling multiple container packages by affixing a plastic clip to a plurality of containers. Preferably the plastic clip has a substantially rigid body portion and depending container gripping portions. The container gripping portions of the clip include an outer peripheral wall tightly engageable with the inside surface of the rim or bead of the container, and an adjacent tooth-like structure engageable with the outside and underside of the bead or rim of the container. The lower ends of the wall and tooth-like structure are spaced apart a distance less than the thickness of the container rim or bead so that these lower ends must be flexed away from each other to permit the rim or bead to enter into the gripping area between the wall and structure. In essence, the gripping portions of the clip are "snapped" on the bead or rim. Normally the outer peripheral wall of the clip engages the top wall of the can. The complete description of this clip is contained in my prior U.S. patent application Ser. Nos. 100,618 and 174,655. This invention is particularly adapted for use with containers, such as the conventional "tin cans," which have top and bottom walls joined by a rim or bead to a cylindrical side wall.

The apparatus of the present invention includes means to feed a plurality of containers to an assembly station and means at this assembly station to feed the plastic clips into engagement with the rim or bead of each of a plurality of containers to form an integral multiple container package.

The method according to the present invention includes continuously feeding a succession of containers along a feed path, and continuously supplying a succession of the clips into engagement with the rim or bead of a plurality of containers moving along the feed path to form an integral multiple container package.

Figure 1:
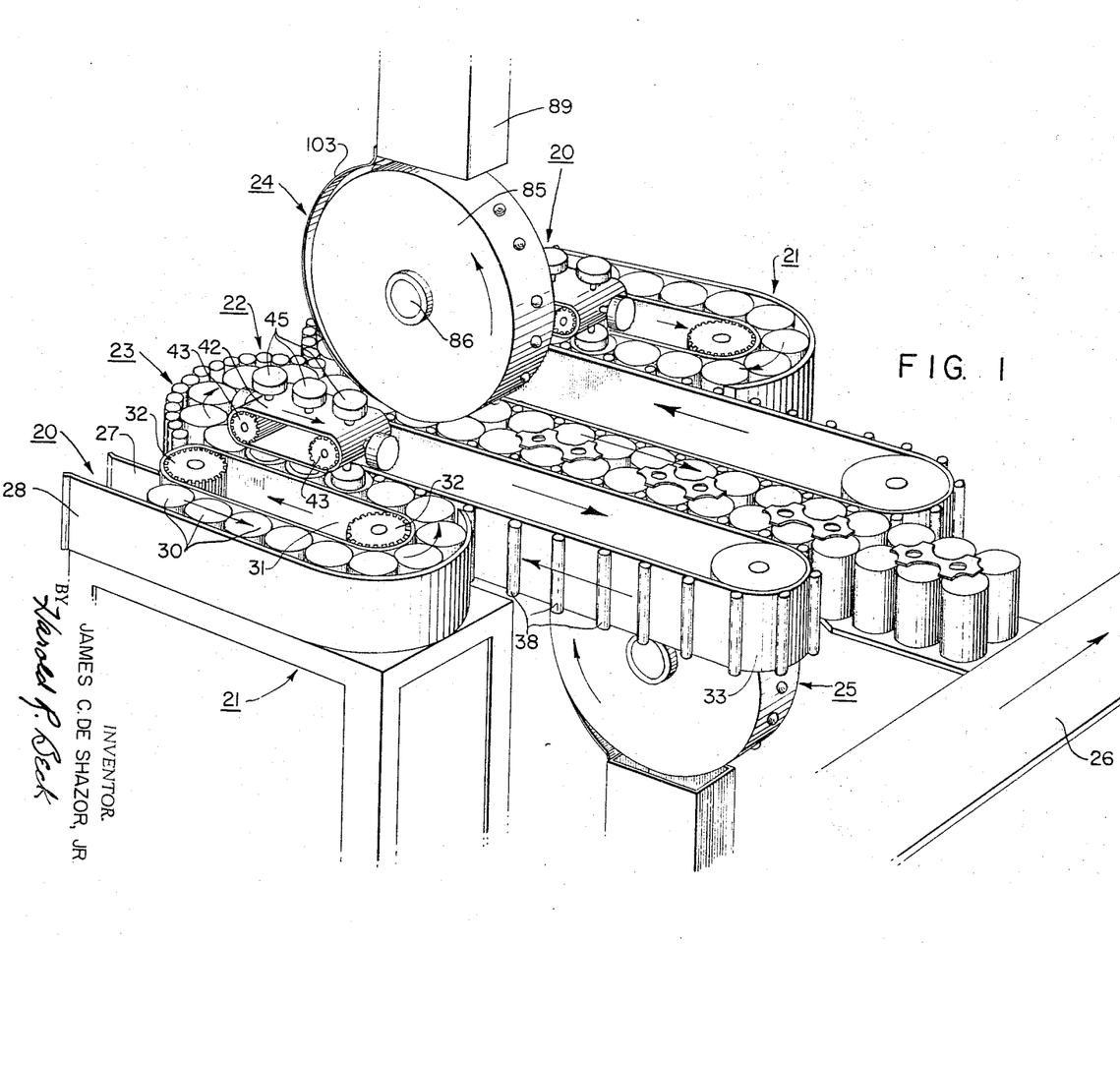
FIGURE 1 is a perspective of an apparatus made according to my invention, with parts removed for clarity.
Figures 2, 14:
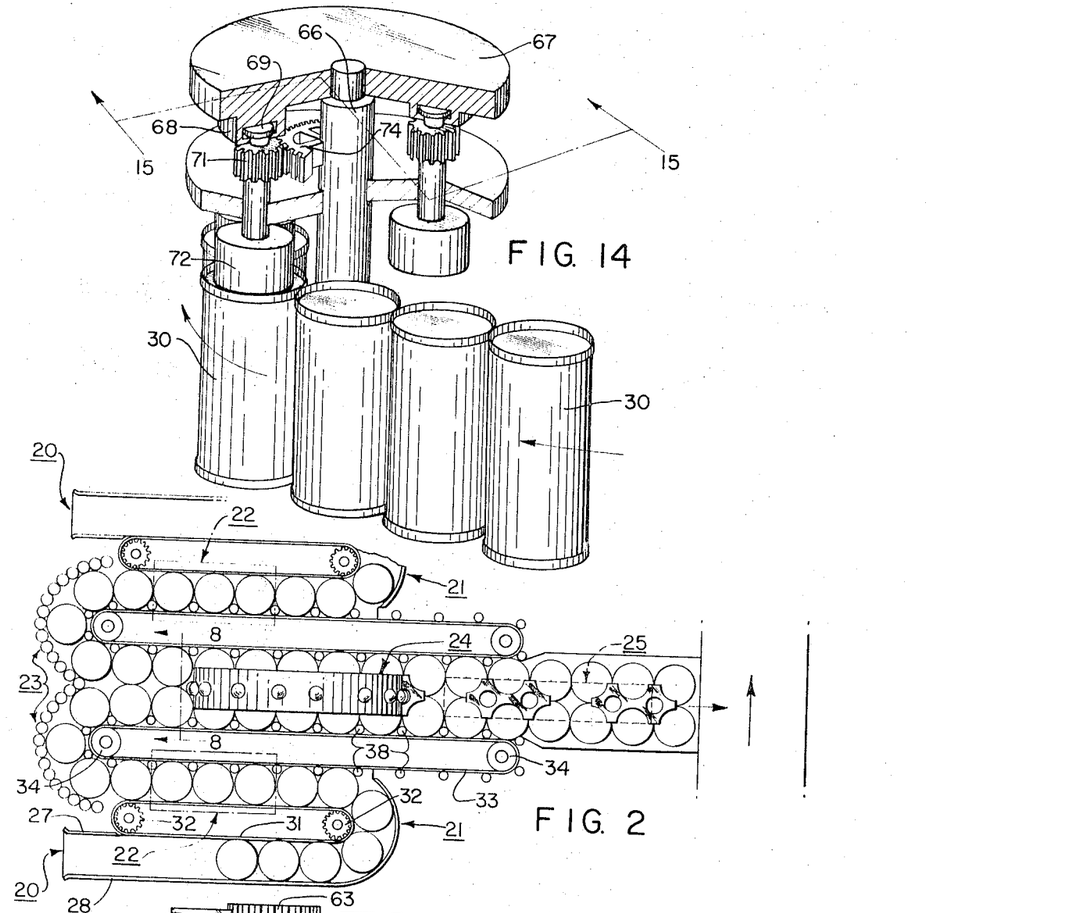
FIGURE 2 is a top plan view of the apparatus of FIGURE 1, with parts removed for clarity.
FIGURE 14 is a perspective of an additionally modified form of my orientation head, with parts removed for clarity.
Figures 3, 4:
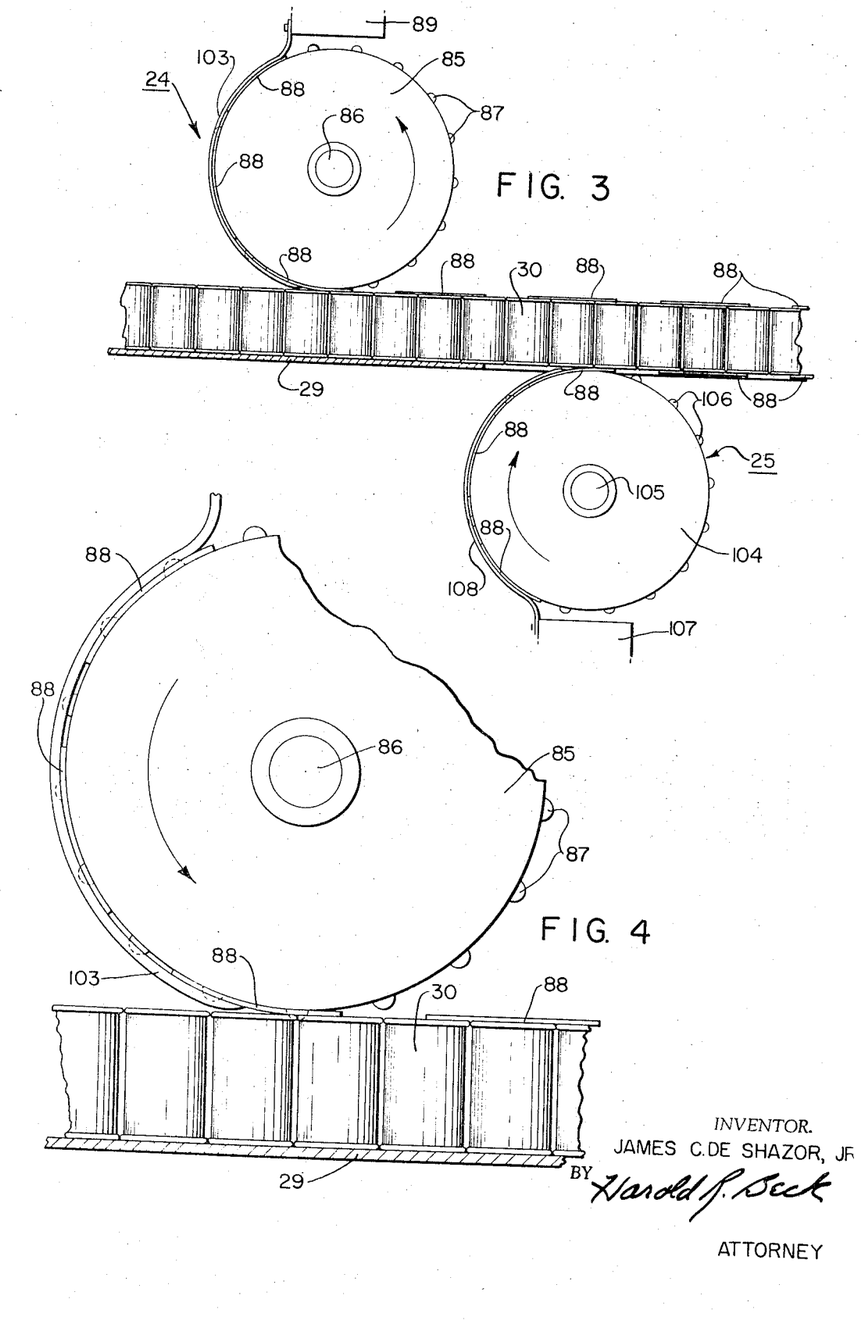
FIGURE 3 is a side elevation view of the apparatus of FIGURE 1, with parts removed for clarity.
FIGURE 4 is an enlarged portion of FIGURE 3.

An important feature of the present invention is the inclusion of an orientation station in my apparatus and method. This orientation station is operative on the cans moving along a feed path and engages each can to rotate the can to a predetermined position. In packaging cans in multiple can packages it is desirable to position the trademark or trade name affixed to the can in a position facing outwardly of the package and this normally necessitates positioning the seam of the cylindrical wall of the container in an inward position. It is also desirable to position the end cans in a conventional "6-pack" at an angle so that the trademark or trade name can be read from the side or end of the package. My invention provides means for rotating the cans, stopping the rotation of the cans in a desired position, and continuing the movement of the cans along the feed path while the orientation is being accomplished. Referring specifically to FIGURES 1, 2, and 3 of the drawings, my apparatus includes, a double infeed end generally designated as 20, which is supplied with cans from a conventional can filling and closing assembly, along a U-shaped path 21, through an orientation station 22, then through a second U-shaped path 23 to a point of juncture of the two feed lines of cans to form a continuous procession of cans two abreast, through a top clip assembly station 24 and through a bottom clip assembly station 25. The clipped cans are then removed on a conveyor 26 to a packing and distribution area.

The cans are fed at the infeed end 20 between an inside upstanding stationary wall 27 and an outside upstanding stationary wall 28. The entire path of the can movement to be described has an underlying stationary plate along which the cans slide, with the exception of the area immediately below the bottom clip assembly station 25 where it is necessary to provide an opening, as shown in FIGURE 3, to permit application of clips to the underside of the cans. This underlying plate is generally designated 29.

The plates 27 and 28 are spaced a sufficient distance apart to freely receive the cans 30. The infeed pressure on the cans push them past the plate 27 until they are engaged by a conveyor 31 continuously moving about a pair of spaced rockets 32. The sprockets are driven by power means (not shown) and the conveyor moves in the direction of the arrows shown in FIGURE 1. As the cans are engaged by the conveyor 31 the cans 30 are moved along the plate 28, and slide along the underlying plate 29, around the first curved portion 21 until the cans are engaged by a second conveyor 33 which is mounted for continuous movement in the direction of the arrows shown in FIGURE 1 about sprockets 34. The sprockets 34 are driven by power means (not shown). The conveyor 33 moves at a surface speed equal to the conveyor 31.

Figures 7, 8, 9:
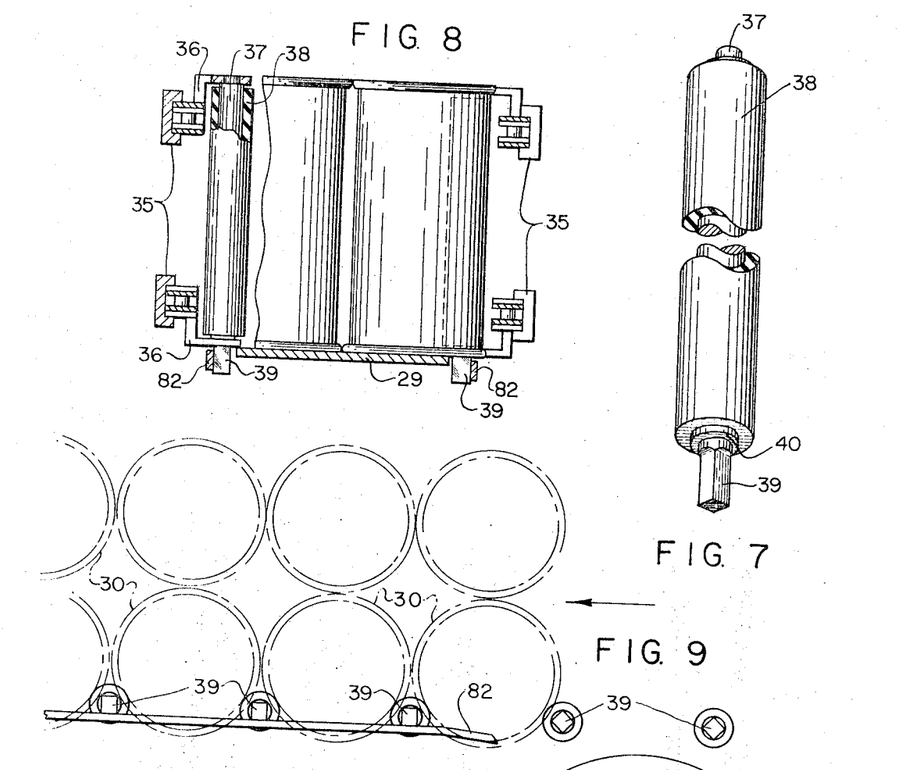
FIGURE 7 is a perspective of a roller portion of a conveyor according to my invention.
FIGURE 8 is a cross section taken on line 8—8 of FIGURE 2, and partly in cross section.
FIGURE 9 is a bottom plan view of a holding bar to prevent rotation of the rollers, made according to my invention.

The conveyor 33 is specifically shown in FIGURE 8 and includes a conventional conveyor chain engaged by and movable with the sprockets 34, and having a plurality of spaced upper end lower L-shaped plates 36 fastened to the conveyor chain. The L-shaped plates 36 provide a rotational mounting for a roller 38 having an axle 37 with a rubber surface coat. The rollers 38 are freely rotatable in vertically aligned holes in the L-shaped plates. The rotation of these rollers is for a purpose to be described hereinafter. The lower end of the roller axle 37, projecting below the lower L-shaped plate 36, is square at 39 as shown in FIGURES 7 and 8. Immediately above the square portion 39 is a circular portion 40 which is received in the opening in the plate 36. The rollers 38 are spaced an equal distance apart on the conveyor 33 such that each roller is positioned between the cans and along the plane of abutting intersection of adjacent cans as shown in FIGURE 2. The rubber surface of the rollers engage the sides of the cans and the rollers rotate as the cans rotate.

The cans are engaged by the rollers and conveyor 33 at a point after they have completed the U-shaped bend 21 as shown in FIGURE 2. The cans are then conveyed along a straight path through the orientation station 22.

The orientation station is shown in FIGURES 1, 10, 11 and 12. My preferred form for the orientation station includes a continuous conveyor 42 passing around a pair of spaced sprockets 43 and supporting a plurality of chucks 45. The conveyor is of conventional construction and includes a flexible chain having individual transversely extending metal slats 44 affixed to the surface of the chain. The sprockets 43 are driven by power means (not shown) and move the conveyor chain in the direction of the arrow shown in FIGURE 1.

Figure 10:
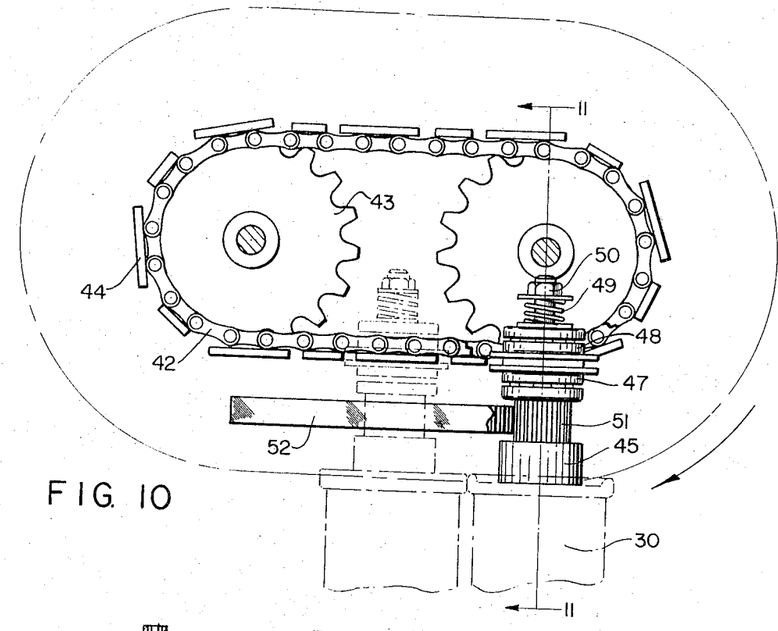
FIGURE 10 is a side elevation view of a first form of an orientation head according to my invention; with parts removed for clarity.
Figure 11:
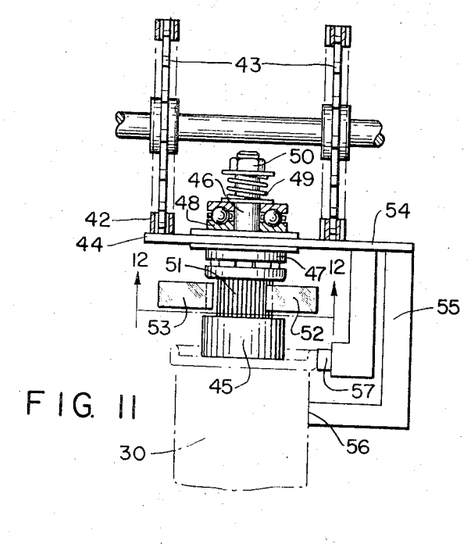
FIGURE 11 is a cross section taken on line 11—11 of FIGURE 10.
Figure 12:
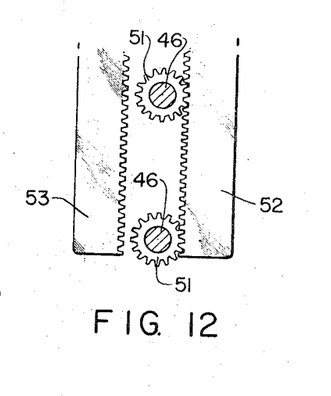
FIGURE 12 is a cross section taken on line 12—12 of FIGURE 11.

A plurality of rotatable chucks 45 are mounted at spaced locations along the conveyor 42. The chucks are equally spaced apart a distance equal to the spacing between the centers of the cans 30 moving along the feed path through the orientation station. Thus one of the chucks engages the center point on the top of each can moving through the assembly station. The movement of the conveyor 42 is coordinated with the movement of the conveyors 31 and 33 so that the cans move smoothly and continuously through the orientation station with the chuck 45 in engagement with the can as shown in FIGURES 10 and 11.

The chuck is preferably mounted to the conveyor on one of the metal slats 44 and includes an integral shaft 46 which passes through an opening in the slat 44 and has an integral stop collar 47 located below the slat 44 and has a thrust bearing 48 mounted immediately above the slat 44. A spring 49 is coiled around the upper end of the shaft 46 and a threaded nut 50 is threadably received on the upper end of the shaft. Thus the chuck 45 can move vertically relative to the slat 44 as viewed in FIGURES 10 and 11. The vertical movement of the chuck is necessary to compensate for minor variations in the top surface of the cans and to insure that the lower surface of the chuck tightly engages the top surface of the can.

An integral circular gear 51 is affixed to the shaft 46 of the chuck immediately above the chuck 45 and engages a rack 52. The rack 52 is rigidly mounted in a stationary position (mounting not shown) such that as the conveyor and chucks move from right to left in FIGURE 10 the chuck is rotated by the gear 51 engaging the rack 52. In essence, the gear 51 is rolled along the rack 52. Since the chuck 45 is in engagement with the top of the can 30, the can is rotated in unison with the chuck as the conveyor 42 moves along a path parallel to the can feed path. The rollers 38 connected to the conveyor 33, are in engagement with the side of the cans during passage through the orientation station as shown in FIGURE 8, and permit rotation of the cans by the orientation assembly of FIGURES 10, 11 and 12.

I have also shown a second rack 53 spaced from the rack 52. If the rack 52 is in engagement with the gear 51 then the rack 53 is out of engagement. A suitable engaging mechanism (not shown) is provided for the racks. The purpose of the rack 53 is to rotate the chucks in an opposite direction from the direction of rotation achieved by engagement of the gears 51 with the rack 52. These racks 52 and 53 provide versatility for the orientation station in that the cans made by various manufacturers have opposite laps in the side seams of the side walls of the cans and therefore require rotation of the cans in opposite directions during orientation. This concept is adequately described in my prior patent applications referred to hereinbefore.

Once the can is rotating during its contact with the chuck 45, it is necessary to stop the rotation with the can seam in a desired position. The manner in which I provide for arresting the rotation is shown in FIGURE 11. An extension 54 on the plate 44 and in integral depending finger 55 provide a stop member which engages the side seam of the can at 56 to stop the rotation of the can. I also provide a second finger 57 which engages the rim or bead of the can to guide the can. Since the vertical side seam of the can provides a ledge against which the stop member can engage, I have found this manner of arresting the rotation of the cans as being the most desirable; however, my prior patent applications, referred to above, disclose various additional methods and apparatus equally usable with the present invention for orienting cans.

Figure 13:
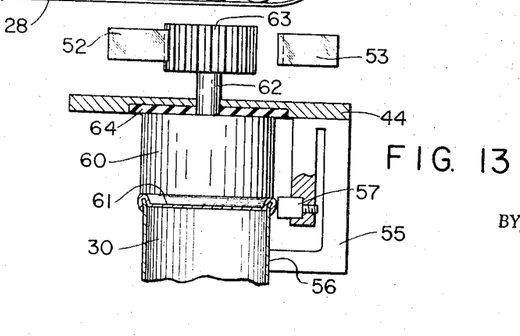
FIGURE 13 is a view similar to FIGURE 11 and showing a modified form of my orientation head.

In FIGURE 13 I have shown a modified form of my orientation assembly in that the chuck 60 is modified to have a lower face 61 which fits into the conventional top recess of a can 30. In this modification, the chuck 60 has an integral vertically extending shaft 62 having an integral circular gear 63 on its upper end. The shaft 62 is rotatably mounted in the plate 44 forming part of the conveyor as shown in FIGURE 10. The stationary rigid racks 52 and 53 are operably related to the gear 63 in the same manner described with respect to FIGURES 10–12 and as the conveyor 42 moves above the can feed path, the gear 63 engages one of the racks 52 or 53 (depending upon the desired direction of rotation) to rotate the shaft 62 and chuck 60. As shown in FIGURE 13, a rubber pad 64 is mounted in the underside of plate 44 and provides a resilient pad against which the chuck 60 engages and permits a limited vertical movement of the chuck to compensate for variations in the top wall of the can 30 and to permit a tight engagement of the bottom face of the chuck against the top wall of the can. I have also provided, as shown in FIGURE 13, a finger 55 engageable with the side wall of the can 30 such that the rotation of the can 30 is stopped when the finger 55 engages the seam of the can at surface 56. I have also provided a guide 57 engageable with the bead or rim of the can. The operation and function of the finger and guide are identical to those hereinbefore described.

Figure 15:
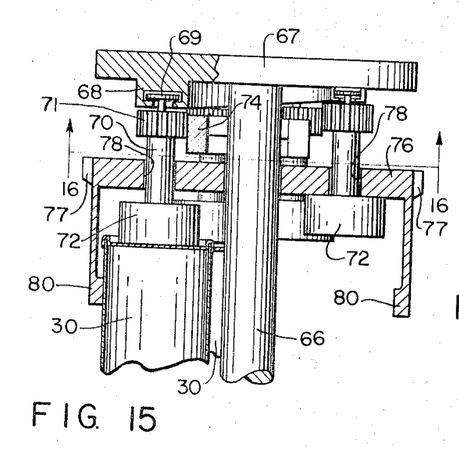
FIGURE 15 is a cross section taken on line 15—15 of FIGURE 14; and,
FIGURE 16 is a view taken on line 16—16 of FIGURE 15.

In FIGURES 14 and 15 I have shown a modified form of my orientation station. The orientation station shown in FIGURES 14 and 15 is positioned at the U-shaped bend 23 of the feed path. As may be noted in FIGURE 14, the cans 30 are moving along the feed path by the force exerted by the conveyors 31 and 33. At the U-shaped bend 23, a vertical stationary shaft 66 is positioned at the central axis of the sprocket 34 and extends upwardly above the top surface of conveyor 33. This shaft is stationary and supports a top circular plate 67 having a continuous raceway integral with its lower face. This raceway is in a circular path around shaft 66 and is C-shaped in cross section with the open side of the C facing downwardly. A portion of raceway 68 passes immediately above the central line of the feed path of the cans while the cans are moving along the circular part of the U-shaped turn 23. The raceway 68 supports a plurality of orientation heads which each include a slide 69 which is slidably captive in the raceway 68. Each slide is affixed to a shaft 70 having an integral circular gear 71. The lower end of shaft 70 has an integral chuck 72 which engages the top surface of a can 30 while moving along the U-shaped turn 23. A gear rack segment 74 is integral with the post 66 and is in a position to be engaged by the circular gear 71 on the shaft 70. Preferably the rack 74 extends only a portion of the way around the shaft 66 but it can form a circular gear concentrically mounted on the post 66. A second plate 76 is rotatably mounted on the shaft 66 and has a continuous peripheral series of gear teeth 77 engaged by a second gear and power means (not shown) for driving the plate 76 in a rotary motion about the shaft 66. The plate 76 has a plurality of holes 78, each of which rotatably receive a shaft 70. As the plate 76 rotates about the post 66, each chuck 72, shaft 70, gear 71, and raceway slide 69 are moved in a circular motion about the pole 66. As is noted in FIGURE 15 the raceway 68 is constructed such that slides 69 are moved to a higher position during a portion of their travel around post 66. Thus by the raceway slide 69 moving in the raceway 68 as the plate 76 is rotated, the chucks 72 are raised and lowered from the two extreme positions shown in FIGURE 15. In this manner, the chucks 72 are raised out of contact with the cans at the desired point in the cycle and lowered into contact with the cans at the desired point in the cycle. The raceway 68 is constructed such that the chucks are lowered into contact with the cans as the cans start their movement about the U-shaped turn 23 so that one chuck is engaged with each can, and the chucks are raised out of contact with the cans after the cans have substantially completed the U-shaped turn 23. The gear segment 74 preferably is engaged by the gears 71 while the chucks are engaged with the cans. I have also provided fingers 80 engageable with the side walls of the cans 30 such that when the chucks 72 and cans 30 rotate, the fingers 80 ride on the can side wall until the vertical side seam of the can comes into engagement with the finger and the can rotation is stopped. At this point the chucks 72 merely continue rotation and sliding on the top wall of the can 30 until the chucks are lifted from the cans or the end of the rack 74 is reached. The fingers 80 are preferably movably mounted (the fingers are shown as being integral with the plate 76) since it is necessary for the fingers 80 to be out of the way of the cans 30 after they have completed the U-shaped bend 23 and move into the straight path toward the assembly station 24. The fingers 80 can be moved to retracted and extended positions by a pneumatic or mechanical mechanism to clear the cans at the appropriate times and to engage the side walls of the cans 30 at the appropriate times in the cycle. The stationary fingers 80 can also be spaced from each other a sufficient distance to permit the cans to enter and leave the orientation station between the adjacent fingers.

Figure 16:
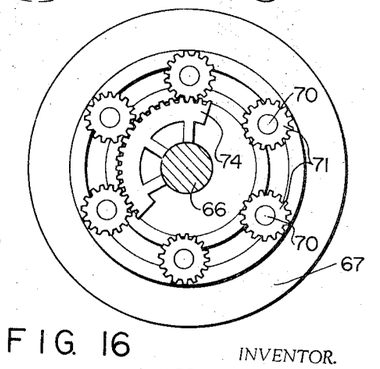

In FIGURE 16 I have shown a bottom plan view of the portion of the modified orientation assembly, taken on line 16—16 of FIGURE 15, to show the portion of the cycle during which the gears are engaged with the racks 74. Preferably this engagement occurs during about 120° of the cycle and during the can movement around part of the U-shaped bend of the can feed path.

As soon as the cans have been properly oriented, it is desirable to prevent further rotation of the cans, and FIGURES 7, 8 and 9 depict the mechanism for minimizing further rotation of the cans. The lower end of each roller 38 is square at 39. This square end portion extends below the plate 29 on which the cans are sliding. Immediately adjacent the path of movement of the square end of the roller 38, I have provided a stationary flat vertically disposed plate 82 located below the plate 29 such that one of the square sides of the portion 39 of the roller engages against the plate 82 and the roller is thereby prevented from further rotation. The flat side of the portion 39 slides along the plate 82 after the cans have been oriented in the orientation station as hereinbefore described and the roller is held stationary for a period at least through the first clip assembly station 24. Since the rollers 38 are in engagement with the sides of the cans, the rollers hold the cans against further rotation.

It is not absolutely necessary that the cans be oriented prior to the application of the clip to form a package; however, it is my preferred form; but it should be realized that the cans can be passed immediately to the clip application stations 24 and 25 without prior orientation of the cans.

After orientation, the cans pass to the clip application stations. In my preferred embodiment as shown, I have illustrated the top clip application station as being the first station through which the oriented cans pass and the bottom clip application station as the second station through which the cans pass; however, it should be realized that these stations can be reversed with the application of the bottom clip being performed ahead of the application of the top clip, or the application of the top and bottom clip can be performed simultaneously. Likewise it should be noted that for some package assemblies it is necessary to apply only a single clip to the top of the package thereby avoiding the use of a double clipping station.

Figures 5, 6:
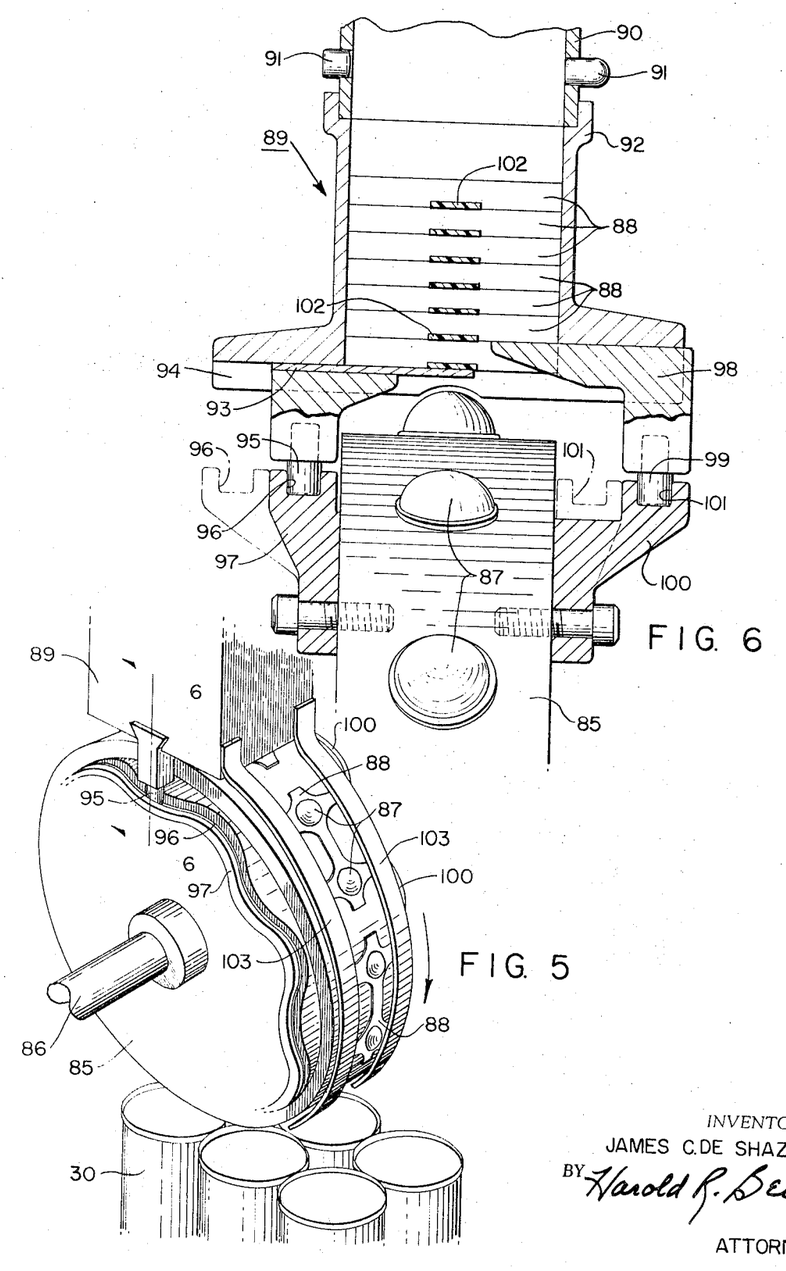
FIGURE 5 is a perspective of a first form of a clip feed and assembly portion of my machine.
FIGURE 6 is a cross section taken on line 6—6 of FIGURE 5.

The top clip application station includes a rotor or wheel 85 rotatably mounted about an axis 86 by power means (not shown). The surface speed of the rotor is equal to the speed of movement of the cans through the clip application station. The surface of the rotor 85 has a plurality of peripheral holding pins 87 which receive the clips 88 (described in my patent applications hereinbefore noted). The clips are fed from a clip feed chute 89 mounted immediately above the rotor 85 and provided with an escape mechanism to permit the release of a single clip for depositing on a pair of adjacent pins 87. In FIGURE 6 I have shown my preferred form of escape mechanism, but it is pointed out that various types of escape mechanisms may be used which are operated hydraulically, pneumatically, or mechanically. In my preferred form the feed chute includes a reserve clip 90 having an electric eye assembly 91 which signals the absence of clips in the reserve chute and notifies the machine operator to supply a new reserve chute of clips. The reserve clip chute is mounted on a housing 92 located in a stationary position immediately above the rotor. The reserve chute 90 and housing 92 are sufficiently large to freely receive a stack of clips 88 and gravity provides an inherent downward movement of the clips. The escape mechanism consists of a first release member 93 extending beneath the stack of clips 88 and slidable in a raceway 94. The member 93 can slide only right and left as viewed in FIGURE 6 in the raceway. The lower face of the member 93 has a follower pin 95 positioned in a continuous groove 96 in a support 97 affixed to the side face of the rotor 85. As may be noted in FIGURE 5, the groove 96 forms a sine wave along the support 97. Thus the follower pin 95, in following the groove 96 during rotation of the rotor 85, moves the member 93 to the right and left as viewed in FIGURE 6. When it is desired to release a clip from the stack in the housing 92 the groove 96 is in a path outwardly from the rotor 85 and thus the outwardly formed path of the groove is at precisely the center point between two adjacent holding pins 87. If the member 93 is moved outwardly from beneath the stack, the entire stack of clips 88 moves downwardly as soon as released, and therefore, it is necessary to provide second release member on the right hand side of the rotor 85. The second release member includes a finger 98 having a follower pin 99 integral with the underside thereof. The follower pin 99 rides in a continuous sine-wave shaped groove 101 in a support 100 affixed to the side face of rotor 85. The finger 98 moves right and left as viewed in FIGURE 6 as the follower pin 99 follows the groove 101 in the support 100. The groove 101 is in an outward position away from the rotor, when the groove 96 is in the inward position next to the rotor, as shown in FIGURE 6. I have shown in phantom in FIGURE 6, the position of the grooves 96 and 101 when the rotor has rotated sufficiently to reverse the positions of the member 93 and finger 98 from the solid line positions shown in this figure. The rotor 85 is constantly rotating and carries the grooves 96 and 101 in a constant rotary motion such that the release mechanism is functioning at all times, periodically releasing clips onto the pins 87.

In operation, the finger 98 moves toward the left (FIGURE 6) under the central portion 102 of the next-to-the-bottom clip 88 and holds the stack of clips while the member 93 moves to the left to release the bottom-most clip 88 in the stack from the housing 92. The bottom-most clip drops onto the pins 87 and is conveyed in a rotary path by the rotor 85. At this point, the finger 98 is supporting the entire stack of clips. After the clip has dropped, the finger 93 then moves toward the right under the central portion 102 of the clips 88 in the housing and the finger 98 moves toward the right to release the stack of clips to the position shown in FIGURE 6 preparatory to the next release of the bottom-most clip. It is important that the finger 98 move under the central portion 102 of the stack of clips before the member 93 moves to the left in FIGURE 6 to release the bottom-most clip; and that the member 93 returns to its depicted position in FIGURE 6 before the finger 98 moves right from under the clips. The grooves 96 are 101 are constructed to accomplish these ends.

I have also provided a pair of spring guides 103 which extend along the periphery of the rotor 85 to hold the clips on the pins 87 as the rotor is rotating downwardly from the clip feed chute. These guides 103 are sufficiently resilient to hold the clips tightly on the pins 87, but do not restrict the clip movement along with the rotor 85. The lower ends of the guides 103 extend to a position immediately adjacent the point where the clips are released into tangential engagement with the cans 30 as shown in FIGURE 4.

Referring specifically to FIGURE 4, it should be noted that the body portion of the clip 88 is moved by the rotor 85 into a tangential abutting position to and above the cans 30 and that the downwardly extending portions of the clip which engage the rim or bead of the can are progressively inserted into locking relationship with the can beads or rims and the top surface of the cans. The rotor aligns the clip with the moving cans 30 and rolls the clip onto the tops of the cans with a minimum stressing of the plastic clip.

The operation of the bottom clipping station 25 is substantially identical to the top clipping station 24 and includes a rotor 104 driven in a rotary motion in the direction of the arrow of FIGURE 3 about a central shaft 105. This rotor is identical in construction to the rotor 85 and includes peripheral holding pins 106 for carrying clips from a feed chute 107 to a tangential point of engagement with the underside of the cans 30. The bottom clipping station is provided with flexible guides 108 similar in construction to the guides 103 of the top clipping station. An escape mechanism to feed clips from the chute 107 is provided which is similar to that described above with respect to chute 89 except it is necessary to apply a positive upward pushing force to the clips to move the clips onto the pins 87 since the flow of the clips is not effected by gravity.

The function and operation of the bottom clipping station is identical to the top clipping station and therefore will not be described in detail.

After the clips have been applied to the top and bottom of the cans, the multiple-can packages are moved to the take-off conveyor 26.

While I have described the present preferred embodiment of my invention, it may be otherwise embodied within the scope of the following claims.

I claim:
1. A machine for orienting cans prior to assembly into a multiple-can package comprising
   (a) feed means to continuously move a procession of cans at a predetermined speed through an orienting station, said feed means including a relatively flat, smooth, rigid stationary plate supporting said procession of cans, a movable conveyor belt disposed vertically adjacent said plate and engaged with said cans, and power means to drive said belt along said plate to slide said cans along said plate, said conveyor belt including vertically disposed rollers mounted on said belt and spaced at intervals thereon, one of said rollers being positioned between each can on said plate, said rollers being rotatable about a vertical axis so that each can may be easily rotated at the orientation station;
   (b) an orienting station including rotatable means engageable with said cans on said feed means, driving means to move said rotatable means along with said feed means at said predetermined speed; actuation means engageable with said rotatable means to rotate the latter when in engagement with said cans to rotate the engaged cans in unison with said rotatable means; and control means to arrest the rotation of said cans in a desired oriented position.

2. A machine according to claim 1 further comprising stop means engageable with said rollers to prevent rotation thereof after said cans have been oriented at the orientation station; and wherein said conveyor extends through said orientation station and to an assembly station where the oriented cans are united to form a multiple-can package.

3. A machine for orienting cans wherein each of said cans has a significant side seam, said machine comprising the machine of claim 1, further characterized in that said control means includes a rigid finger engageable with said seam during rotation of the can by said rotatable means, to stop the rotation of the can in a desired oriented position.

4. The machine of claim 1 wherein said driving means comprises a continuous conveyor passing around a pair of spaced driven sprockets; said rotatable means comprises a plurality of rotatable chucks spaced on said continuous conveyor and, said actuation means comprises an integral circular gear on the shaft of said chuck and a stationary rack co-acting with said gear as said chuck moves along said feed path.

5. The machine of claim 1 wherein said driving means comprises a driven circular plate; said rotatable means comprises a plurality of rotatable chucks having faces and shaft, said shafts slidably projecting through said driven circular plate, said driven circular plate being rotatably mounted on a stationary vertical shaft, said stationary shaft having a fixed plate mounted thereon in spaced relation to said driven plate such that said fixed plate is on the side of said driven plate away from said chuck faces, the distal ends of said chuck shafts each having a raceway slide engaging a variable depth raceway on the face of said fixed plate, said chuck shafts each having a circular gear thereon, said circular gear engaging a rack extending a portion of the way around said fixed shaft upon rotation of said driven plate to cause the rotation of said chucks.

References Cited

UNITED STATES PATENTS

| | | | |
|---|---|---|---|
| 1,990,498 | 2/1935 | Nordquist | 101—38 |
| 2,042,733 | 2/1936 | Risser | 53—279 X |
| 2,508,259 | 5/1950 | Helme | 198—33 |
| 2,528,912 | 11/1950 | Rappaport et al. | 198—33 |
| 2,709,856 | 6/1955 | Hunter et al. | 198—33 X |
| 3,189,158 | 6/1965 | Lucas | 198—33 |
| 3,196,589 | 7/1965 | Cook | 53—48 |
| 3,218,777 | 11/1965 | Brunsing | 53—48 |

FOREIGN PATENTS 927,691   6/1963   Great Britain.

TRAVIS S. McGEHEE, *Primary Examiner.*

FRANK E. BAILEY, *Examiner.*

L. S. BOUCHARD, *Assistant Examiner.*